(12) United States Patent
Travis et al.

(10) Patent No.: US 6,712,471 B1
(45) Date of Patent: Mar. 30, 2004

(54) WIDE-FIELD-OF-VIEW PROJECTION DISPLAY

(76) Inventors: Adrian Robert Leigh Travis, Wrangaton House, Wrangaton, South Devon, TO10 9HH (GB); Nathan Stuart Marston, Christ's College, Cambridge, CB2 3BU (GB)

(*) Notice: Subject to any disclaimer, the term of this patent is extended or adjusted under 35 U.S.C. 154(b) by 0 days.

(21) Appl. No.: 09/937,756
(22) PCT Filed: Mar. 31, 2000
(86) PCT No.: PCT/GB00/01248
§ 371 (c)(1), (2), (4) Date: Jan. 7, 2002
(87) PCT Pub. No.: WO00/58932
PCT Pub. Date: Oct. 5, 2000

(30) Foreign Application Priority Data

Mar. 31, 1999 (GB) .............................................. 9907277

(51) Int. Cl.⁷ .................. G03B 21/00; G03B 27/22; G03B 27/14; G02F 1/1335; G03H 1/00
(52) U.S. Cl. ................. 353/7; 353/8; 353/122; 349/11; 359/13; 359/462; 359/478; 359/630; 345/8
(58) Field of Search .............. 353/5, 6, 7, 8, 353/10, 11, 12, 13, 14, 62, 81, 122; 349/11; 359/13, 14, 15, 19, 22, 23, 27, 28, 630, 462, 466, 467, 478; 345/8

(56) References Cited

U.S. PATENT DOCUMENTS

| | | | | |
|---|---|---|---|---|
| 3,609,706 A | | 9/1971 | Adamson | 340/173 |
| 4,147,419 A | * | 4/1979 | Boyan | 354/66 |
| 4,157,218 A | * | 6/1979 | Gordon et al. | 354/66 |
| 4,429,421 A | | 2/1984 | Levy | 3/13 |
| 5,132,839 A | | 7/1992 | Travis | 359/462 |
| 5,600,454 A | | 2/1997 | Trayner | 359/15 |
| 6,115,059 A | * | 9/2000 | Son et al. | 348/46 |
| 6,433,760 B1 | * | 8/2002 | Vaissie et al. | 345/8 |
| 6,480,344 B1 | * | 11/2002 | Maruyama | 359/721 |
| 2001/0028434 A1 | * | 10/2001 | Carter | 351/161 |

FOREIGN PATENT DOCUMENTS

| | | | |
|---|---|---|---|
| WO | WO 9815128 A | 4/1998 | H04N/9/31 |
| WO | WO 9534014 A | 12/1998 | G02B/27/01 |

OTHER PUBLICATIONS

Amitai, "Visor–display design based on planar holographic optics," Applied Optics, Mar. 10, 1995, pp. 1352–1356, vol. 34, No. 8.
Travis, "Autostereoscopic 3–D display," Applied Optics, Oct. 10, 1990, pp. 4341–4343, vol. 29, No. 29.
Travis, "The Display of Three–Dimensional Video Images," Proceedings IEEE, Nov. 1997, pp. 1817–1832, vol. 85, No. 11.

* cited by examiner

Primary Examiner—Neil Adams
Assistant Examiner—Melissa J Koval
(74) Attorney, Agent, or Firm—Young & Basile P.C.

(57) ABSTRACT

A wide-field-of-view projection display comprises a circularly symmetric lens and an array of light emitters, positioned along the focal circumference of the circularly symmetric lens so that light from each of the light emitters is substantially collimated by the lens in a different direction. A ray-diverting means, such as a slab waveguide or a reflector, ejects the collimated light out of the plane of the lens to the viewer. The planar circularly symmetric lens has no aberration, allowing adjacent views to be seamlessly joined because they can all be diffused by the same angular amount.

22 Claims, 7 Drawing Sheets

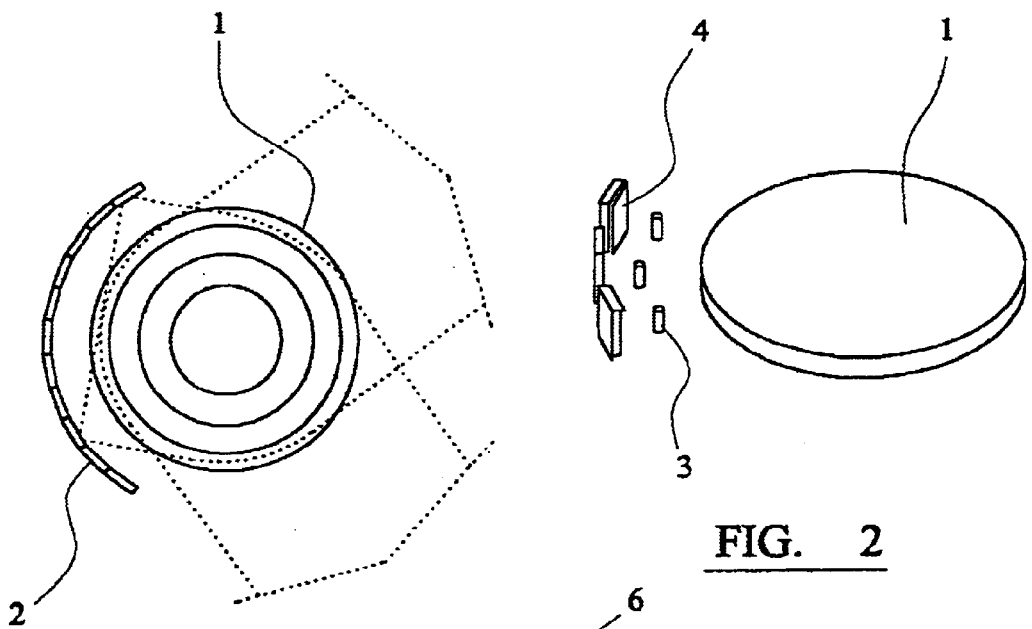
FIG. 1
FIG. 2
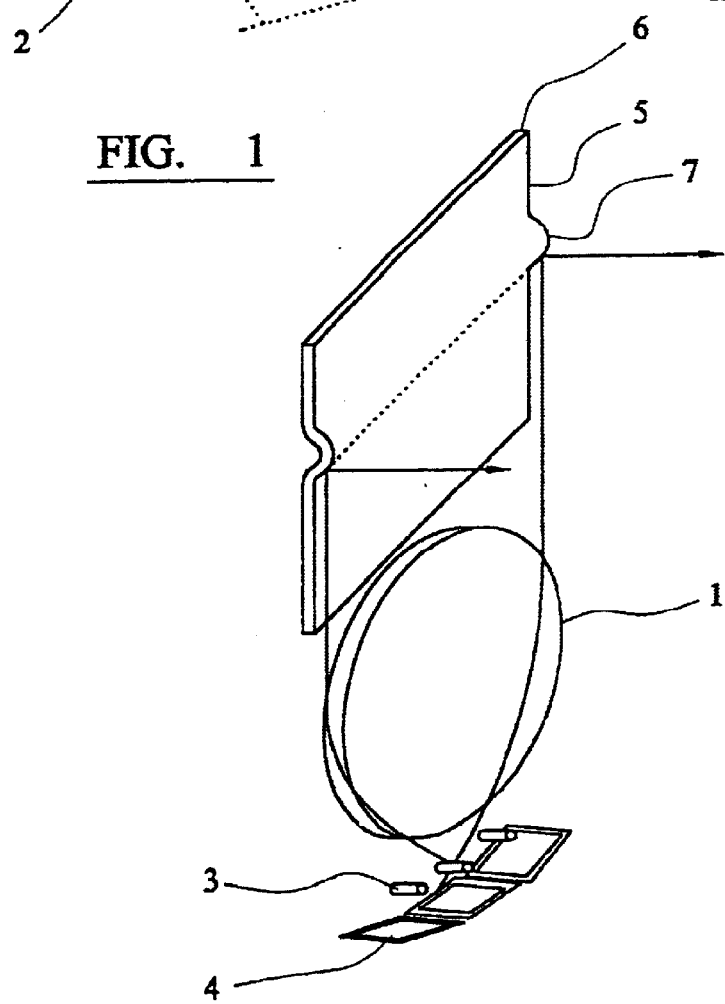
FIG. 3

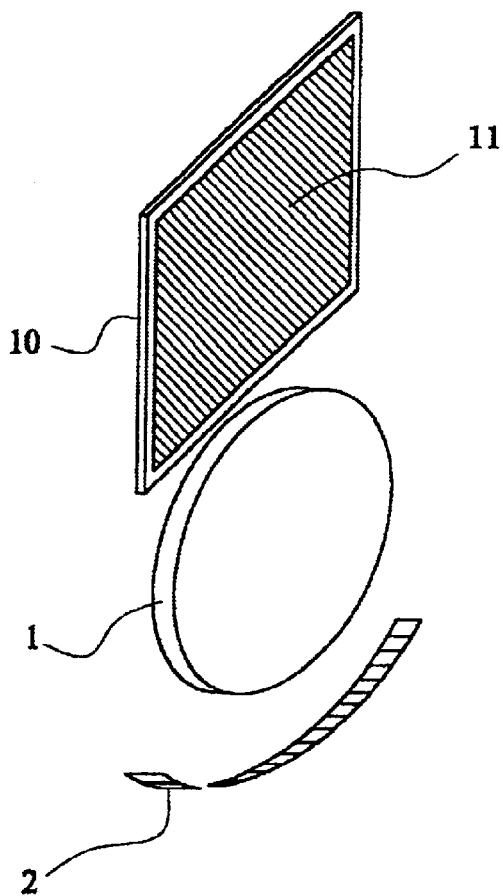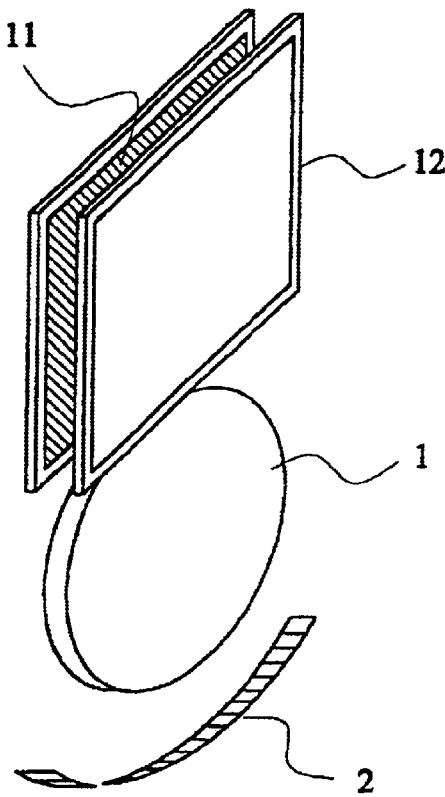
FIG. 7  FIG. 8
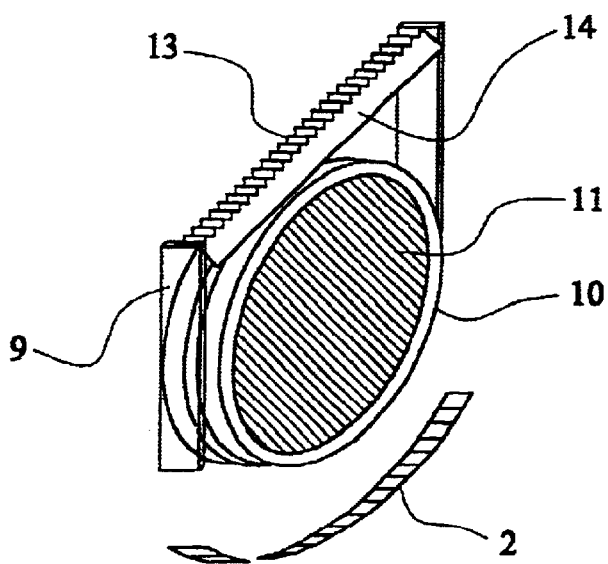
FIG. 9

WIDE-FIELD-OF-VIEW PROJECTION DISPLAY

This invention relates to the field of 3D displays, head-mounted displays and moving projection displays and is a way of increasing their field of view.

Projection displays conventionally comprise a two-dimensional (2D) array of light emitters and a projection lens. The lens forms an image of the array at some plane in space, and if this imaging plane is far from the projection lens then the effect of the projection lens is to collimate light from any pixel on the two-dimensional array.

It is also possible for a large-diameter projection display to be placed behind a liquid-crystal a display or some other spatial light modulator in order to synthesize a three-dimensional image, as described in Travis, A. R. L., "Autostereoscopic 3-D Display," Applied Optics, Vol. 29, No. 29, pp4341 to 4343, Oct. 10, 1990. One pixel at a time of the two-dimensional array of light emitters is illuminated, and an appropriate view of a three-dimensional object is thus simultaneously displayed on the liquid-crystal display in such a way that the view of the three-dimensional object is only visible if observed from the direction in which the rays of light collimated by the projection lens from the pixel are travelling. A sequence of views is repeated at a rate faster than that at which the eye can detect flicker, thereby time-multiplexing a three-dimensional image. It is furthermore possible in principle to create a holographic three-dimensional image by placing a two-dimensional array of point source light emitters in the focal plane of the projection lens, illuminating each point source in turn, and displaying appropriate holograms on a liquid-crystal display placed on top of the projection lens so that each hologram is made visible to a different point of view in turn.

Projection displays are most commonly directed so that the image of the array falls on a large translucent screen, and a viewer looking at the screen will see a greatly magnified image of the picture that is displayed on the two-dimensional array. However, it is becoming increasingly common for small projection displays to be mounted on the head of the viewer so that the projection display is directed towards the viewer's eye, and light collimated by the projection lens from a single pixel on the two-dimensional array of light emitters is subsequently focused by the viewer's cornea onto the viewer's retina so that the viewer sees an apparently distant image often known as a virtual image.

Head-mounted displays are bulky and users would prefer them to be flat. A head-mounted display can be made flatter, for example, using a slab waveguide incorporating a weak hologram, as disclosed in Amitai, Y., Reinhorn, S. and Friesem, A. A., "Visor-display design based on planar holographic optics," Applied Optics, Vol. 34, No. 8, pp. 1352 to 1356, Mar. 10, 1999. Light from a cathode-ray tube and a further hologram can be coupled into the waveguide, and this light will be diffracted out of the waveguide by the weak hologram in directions which are determined by the pixel within the cathode-ray tube from which the light was emitted.

Three-dimensional images synthesized as described above by time-multiplexing the illumination of a liquid-crystal display require the liquid-crystal display to have a fast-switching array of thin-film transistors and these are expensive. Trayner and Orr (U.S. Pat. No. 5,600,454) have demonstrated a device which avoids this by placing a hologram behind a conventional liquid-crystal display that directs the illumination of alternate rows to a left-eye or right-eye view. But both this and the switched illumination concept described above are bulky, and users would prefer that three-dimensional displays were flat.

Instead, a flat-panel three-dimensional display can be made by combining a projection display with a screen on which light shone parallel to the surface of the screen is ejected at one of a set of selectable lines along the screen, as disclosed in WO 98/15128. One line at a time on the screen is selected, and simultaneously the projection display projects a line of pixels parallel to the screen so that they are ejected at the selected line. The same line of pixels on the projection display is altered repeatedly as each of the series of lines on the screen is selected in turn in such a way as to time-multiplex a complete image on the screen only one line of the projection display is used, so the array of light emitters need be only one line high, and if the emitted light is collimated in the plane of the screen then the projection lens need be only one or two millimetres high so that the combined projector and screen are flat.

With this construction if it is light from a three-dimensional display, albeit one whose array of light emitters is only one pixel high, which is directed parallel to the surface of the screen of selectable lines, then the image formed on the screen is three-dimensional. The three-dimensional display might comprise an array of light emitters behind a projection lens with a liquid-crystal display in front of the projection lens as described above, but in order to put up several views within one line period of the display, the switching rate of the liquid crystals would need to equal the number of views times the line rate of the display, and few liquid-crystal mixtures switch this fast.

Many other kinds of autostereoscopic and holographic three-dimensional display concepts exist and any could possibly be adapted to be used in a flat-panel system. Particularly interesting is an old concept comprising a group of small video projectors in the focal plane of a field lens—see A. R. L. Travis, Proc. IEEE Vol. 85, no. Nov. 11, 1997, pp. 1817–1832. Each projector is positioned to form a view in the plane of the field lens just as if the lens were a translucent screen, but unlike a translucent screen the field lens collimates the light so that the picture is visible from only a single direction. The other projectors form views which are made visible by the field lens to other directions so that the viewer sees an autostereoscopic three-dimensional image.

The problem with this concept is that it is difficult to design a projection lens whose pupil equals the lens's physical diameter; as a result there are gaps between the video projectors which form dark zones between adjacent views of the three-dimensional image. A slightly diffusive element can be used to reduce these gaps, but the angle of diffusion usually varies with incident light angle. Aberrations in the field lens mean that rays collimated by the lens from a single point hit the diffusion screen at slightly different angles of incidence over the diameter of the screen. This means that the angles of diffusion vary, and even though the variance is slight it is enough to cause observable gaps between the views nearer-normal (if the projector spacing is set to eliminate all overlap) or overlaps between views (if the projector spacing is set to eliminate gaps).

In fact, a further major problem with three-dimensional displays and head-mounted displays in particular is that their field of view is limited by the aberration of the projection lens. At fields of view beyond 20° the lens collimates light so poorly that the image is too distorted for most applications.

The present invention aims to overcome or at least alleviate some of the problems with projection displays known in the art.

The present invention contemplates a wide-field-of-view projection display making use of a circularly symmetric lens, sometimes called a monocentric lens, and a corresponding curved array of light emitters; the centre of curvature of the array is at the centre of the circularly symmetric lens and the array is placed at or near the focal plane of the circularly symmetric lens. Circularly symmetric lenses have been used before—see U.S. Pat. No. 5,132,839 (Travis), but they are difficult to manufacture in a bulk-optic design.

According to a first aspect of the invention therefore there is provided a wide field of view projection display comprising: a generally planar circularly symmetric lens and an array of light emitters, positioned along the focal circumference of the circularly symmetric lens so that light rays from each of the light emitters is substantially collimated by the lens in a different direction from its neighbouring light emitters; and a ray-diverting means for ejecting the collimated light out of the plane of the lens towards the viewer.

The ray-diverting means is generally in the shape of a panel co-planar with or parallel to the plane of the lens and preferably comprises line-selecting means for selecting one line at a time of a changing image from the array of light emitters so as to display that line. In this case, the ejection may be brought about by deflection of the rays from the panel at the selected line. For example, the panel may include a reflective sheet and a transducer for producing a localized, linear, acoustic or surface wave in the sheet, the presence of the wave at a given position causing reflection of the ray and thus the said deflection at that position. In this construction, the wave created by the transducer travels along the panel successively ejecting the lines in its path. Alternatively a rotating-mirror arrangement can be used to scan each line over the height of a screen.

Alternatively the diverting means may be a flat panel of material which is not opaque to the rays and which is preferably parallel to the lens and aligned with the lens edge through which the rays emerge, so that it acts as a slab waveguide.

The line-selecting means may be provided by a layer or strip on the panel or at any other position in the collimated beam of light, which is switchably reflective or transparent, the means for selecting the position at which the rays are ejected being adapted to change the state of the switchable layer. Such a layer may be a liquid-crystal display.

The switchable layer may work in transmission (so that the rays in the selected line travel through the layer and others are reflected) or in reflection (the selected line only is reflected. In this latter mode, the grating may be arranged to eject light only out of one surface of the panel in the direction of the switchable layer. Such a grating may be positioned within the panel. The selected line is then reflected back through the panel by the switchable layer. In this mode, the selecting means are therefore provided behind the panel, from the viewer's perspective. Reference may be made to WO 95/15128, mentioned above, for more information.

Each light emitter used in the present invention may include a microdisplay, generally a small LCD with a collimated light source behind it, if transmissive, or in front of it, if reflective. The light emitter may simply be a microdisplay positioned at the focal circumference. Alternatively, each light emitter may comprise a microdisplay and an individual lens, arranged so that the microdisplay emits light which is then converged towards the individual lens. Each individual lens should be positioned on the focal circumference of the circularly symmetric lens and acts essentially as a point source from which collimated light can be produced.

In general the microdisplay will be one dimensional, consisting of, a row of columnar pixels, and the corresponding lens is cylindrical and separated from the microdisplay by its focal distance if the lens is cylindrical, the microdisplay is thus positioned on the focal circumference. Neighbouring microdisplays each project a single-line image of an object, the images differing only in the angle of view.

Alternatively, each light emitter may simply comprise a source of light positioned on the focal circumference of the circularly symmetric lens. In this construction, a one-dimensional switchable strip is provided in the path of the collimated rays. The strip is preferably between the circularly symmetric lens and the ray-diverting panel. If the light sources are point sources, the strip may be used to display a hologram by suitable addressing of the strip. Alternatively, abutting sources can be used to display an auto-stereoscopic view. The emitters are activated in turn and the pattern displayed on the strip is synchronized with the actuation of the emitters.

The display according to the invention may include a diffuser positioned in the collimated light to narrow gaps in the beam between the light from each light emitter. The diffuser may be formed as a diffraction grating or lenslet screen and is preferably positioned adjacent to the flat panel. The diffuser will generally be necessary for autostereoscopic displays in order to ensure that there are no gaps between views; holographic displays will not generally need a diffuser.

A frame store may be provided for each microdisplay to store successive images of a moving display before they are: applied to the projectors; this makes it possible to compensate for any optical deficiencies, or geometrical distortion such as shear due to the angle of projection of the side projectors.

In one preferred embodiment of the invention, a reflector, such as a mirror, is provided to at least one side of the panel to reflect an outer portion of the images from the more off-axis projectors that miss the panel, back onto the panel. Such a reflector reduces the gap that may be produced at the side of the image by rays from outer microdisplays in the array. A straightforward reflector would reflect the outer image portion across to the opposite of the image from its correct position. Preferably therefore, image-processing means are provided, to ensure that the reflected, pixels are reflected onto the correct side of the image. These may be provided in conjunction with the frame store and act to swap pixels at the outer edges of the frame store.

The display according to the invention may be arranged with the circularly symmetric lens, panel and microdisplay (where applicable) in substantially the same plane. Alternatively, the planes in which the panel and lens are formed may be adjacent and parallel. In this case, folding means are required to fold the optical system so that rays emitted from the edge of the lens are directed onto the panel. The folding means may also fulfill the function of retrieving rays which will otherwise miss the panel. The folding means may comprise a retroreflector, preferably situated next to the portion of the lens from which the rays emerge, and angled mirrors to either side of the retroreflector. The retroreflector is preferably positioned in a plane substantially perpendicular to the side mirrors and the prisms of the retroreflector run perpendicular to its longitudinal axis.

In another embodiment, for a virtual display, the rays at any position on the panel are ejected. To this end, the panel may include a weak diffraction grating, which causes collimated light to travel in a particular direction. The grating should be provided on the side of the panel through which the rays are ejected.

Specific embodiments of the invention will now be described by way of example with reference to the accompanying drawings, in which:

FIG. 1 illustrates the use of a monocentric lens in accordance with the underlying principle of the invention;

FIG. 2 illustrates a wide-field-of-view multiple-projector autostereoscopic three-dimensional display according to a first embodiment of the invention, where the screen is only one pixel width high;

FIG. 3 illustrates a flat-panel wide-field-of-view autostereoscopic three-dimensional display making use of the embodiment of FIG. 2, showing a screen on which light shone parallel to the surface of the screen is ejected at one of a set of selectable lines along the screen;

FIG. 7 illustrates a wide-field-of-view flat-panel projection display according to an embodiment of the invention, using a diffraction grating;

FIG. 8 illustrates a holographic wide-field-of-view flat panel display according to this embodiment, using a liquid-crystal panel;

FIG. 9 illustrates the display according to a development of the second embodiment and shows how a pair of mirrors and a one-dimensional retroreflector can keep illumination uniform even at large off-axis angles;

Figure 4:
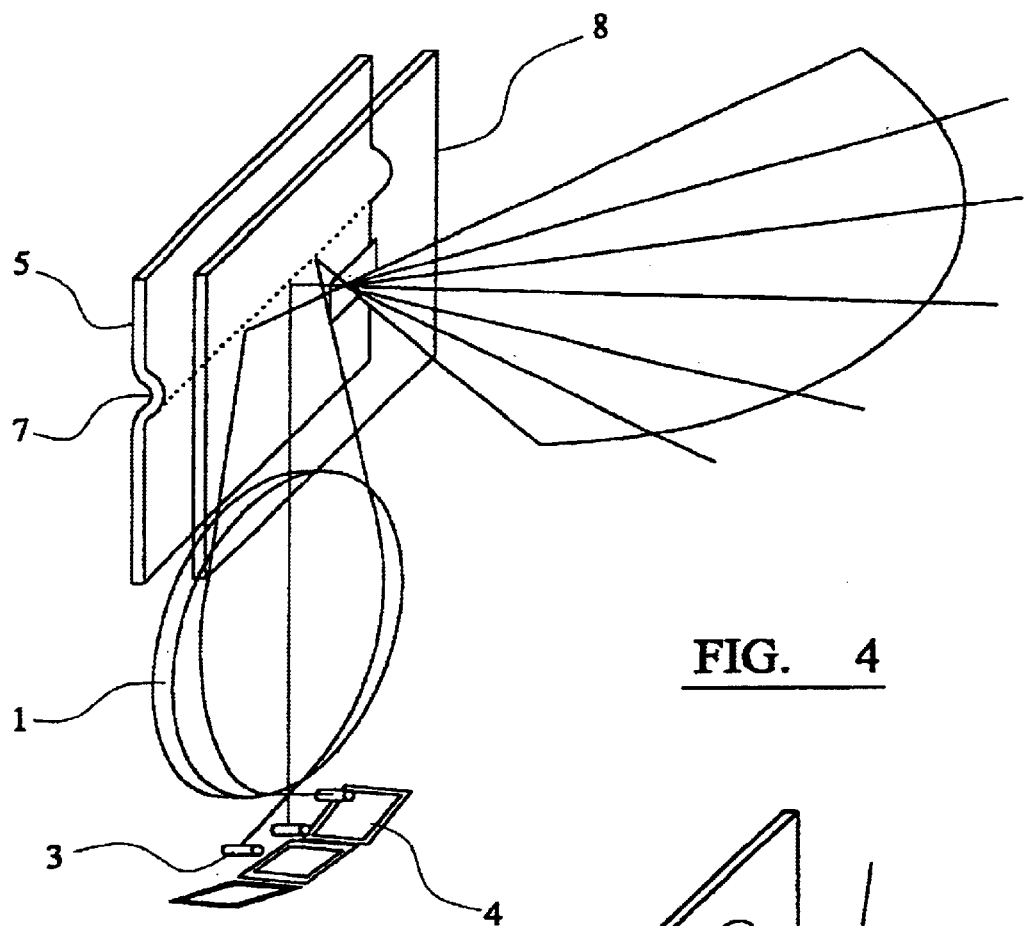
FIG. 4 illustrates how a diffuser is used to eliminate the gaps between adjacent views on a wide-field-of-view three-dimensional display according to the first embodiment.

Referring to the drawings, the projection display of FIG. 1 comprises a circularly symmetric lens 1 and an array of light emitters 2 which is curved so that each of the light emitters 2 lies in the focal plane or focal surface, of the circularly symmetric lens 1.

The circularly symmetric lens 1 comprises a series of concentric coplanar transparent annuli whose refractive indices are chosen so that the lens 1 collimates light from any point on the focal plane. Between the edges of adjacent annuli a conventional anti-reflection coating,may be applied. For example, a disc of polymethyl methacrylate of radius 50 mm inside an annulus of polycarbonate of internal radius 50 mm and external radius 100 mm will collimate light from any point on a focal plane or ring of radius 172 mm. Alternatively the circularly symmetric lens 1 may comprise a graded-index disc whose refractive index varies with radius and is largest at the centre. A second alternative is that the circularly symmetric lens 1 may comprise a disc of material whose thickness varies with radius. In this case, light from the array of light emitters 2 is injected into the edge of the disc at a single angle, slightly off, the normal to the disc axis; the flat surfaces of the disc make it behave like a slab waveguide and guide light by total internal reflection from one edge to the other. The disc becomes thicker towards the centre, and as rays are guided into thicker parts of the disc the angle between ray direction and the axis of the disc becomes smaller. The resolved part of the ray direction in the plane of the disc therefore becomes smaller, so that the rays take longer to travel through the centre of the disc than the edges. The disc therefore collimates light in much the same way as a graded-index lens.

In the autostereoscopic three-dimensional display of FIG. 2, each light emitter in the curved array of light emitters 2 comprises a small cylindrical lens 3 illuminated by collimated light from a laser source (not shown), reflected off a microdisplay 4 and converged by a further lens or lenses, likewise not shown, onto the small lens 3 which thus acts as a small light source. The microxdisplay 4 could instead be transmissive. Each microdisplay consists of a row of vertical pixels.

In FIG. 3, light emitted from the small lens 3 after modulation by the microdisplay 4 is converted to a parallel beam by the circularly symmetric lens 1 and shone parallel to and slightly above the surface of a sheet of reflective foil 5. A transducer 6 at one end of the sheet of foil 5 sets up a single surface wave 7 which travels the length of the foil 5 in the direction of propagation of the light, and which reflects the injected light at different lines along the foil S as the surface wave 7 travels, because its height is sufficient to intercept the light from the lens 1.

Arrangements of this sort are described in the inventorys earlier WO 96115128.

If we consider light from a single microdisplay 4 at a single instant, the light will be modulated by the microdisplay 4, converged on to and then expanded by the small lens 3 and collimated by the circularly symmetric lens 1 to produce a series of parallel rays travelling parallel to the plane of the foil 5. When this light hits the surface wave 7 the light will be ejected from the screen in a particular direction within the horizontal plane containing the wave (taking the foil to be vertical), and if a viewer observes the foil 5 from that direction he will see a line of pixels visible at the surface wave 7. In successive instants as the surface wave 7 moves down the sheet of foil 5, lines of pixels can be made visible at other positions on the sheet of foil 5, and if this is repeated sufficiently quickly the viewer will see a time-multiplexed two-dimensional image.

This idea can be taken further by including further microdisplays at different angles around the axis of the lens, to increase the range of possible angles of view. In a similar manner these other microdisplays 4 can be modulated to produce other two-dimensional images on the sheet of foil 5, but each two-dimensional image will be visible from a different direction in the horizontal plane, i.e. in azimuth. If each two-dimensional image is a view of what the viewer would see were there to be a three-dimensional object in place of the sheet of foil 5, then the image seen by the viewer would appear to be three-dimensional. There is one important proviso, namely that as the viewer moves the head from side to side, the viewer will see different views of the three-dimensional image, but there will be gaps between each view where the viewer can see nothing because the field of view of each two-dimensional image in the system so far described is narrow because each image starts from an effective point source in the form of the small lenses 3. A solution to this is to add a diffuser 8 as shown in FIG. 4, comprising a grating or screen of lenslets which expands the field of view of each two-dimensional image so that there are no gaps between adjacent views.

Diffusers, like lenses, suffer from aberrations in the sense that rays travelling from different angles to the plane of the diffuser are diffused by slightly different amounts. This would mean that light collimated at different angles by a central lens, depending on how far from the propagation axis the individual projector was, would be diverged by different amounts. But because the circularly symmetric lens has no aberrations, the light for each view is properly collimated, so all the rays which comprise the view are diffused by the same amount. It is therefore possible to close the gap between each pair of adjacent views by moving the relevant microprojectors 4 without there being any overlap, even at extreme angles of view.

Figure 5:
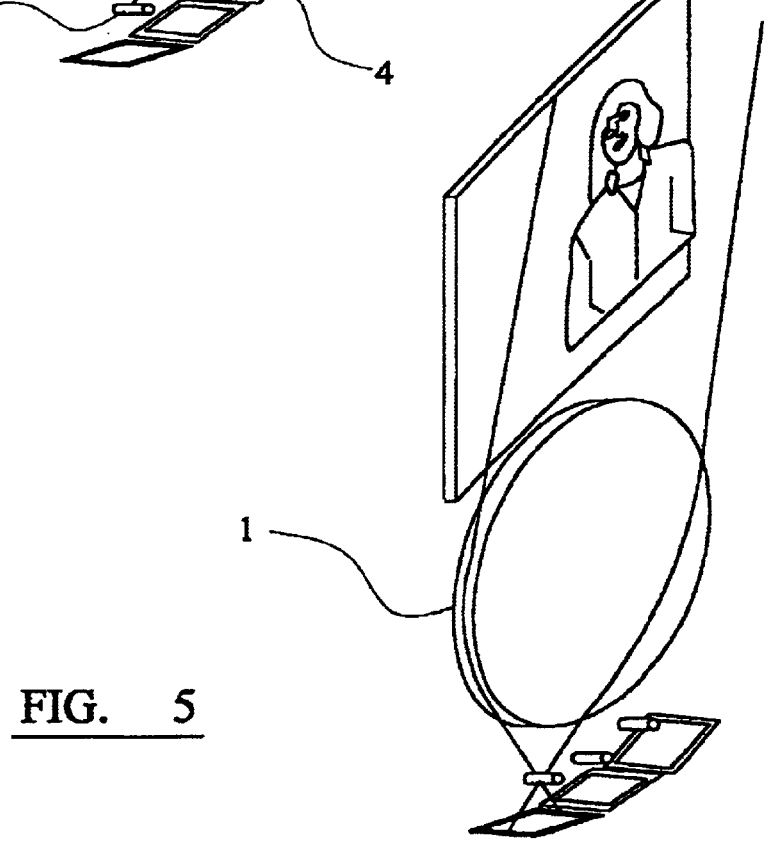
FIG. 5 illustrates how, without anticipatory correction, rays from an off-axis microdisplay on a wide-field-of-view three-dimensional display according to the first embodiment will produce a view distorted by shear.

A problem nevertheless arises in that, at extreme angles of view, the rays on one side, e.g. from the ends of the curved microdisplay line, go over the edge of the sheet of foil 5 before hitting the surface wave 7, while the rays on the other side leave an increasingly large part of the surface wave 7 unilluminated, as shown in FIG. 5. The picture is distorted by shear, and a dark triangular gap appears at the top of each off-axis view. The distortion can be anticipated and corrected by digital pre-processing of the image in a frame, store before display on the projectors, and digital pre-processing can also be used to eliminate the triangular gaps provided that a pair of mirrors 9 are added to the system, as shown in FIGS. 6a and 6b.

Figure 6A:
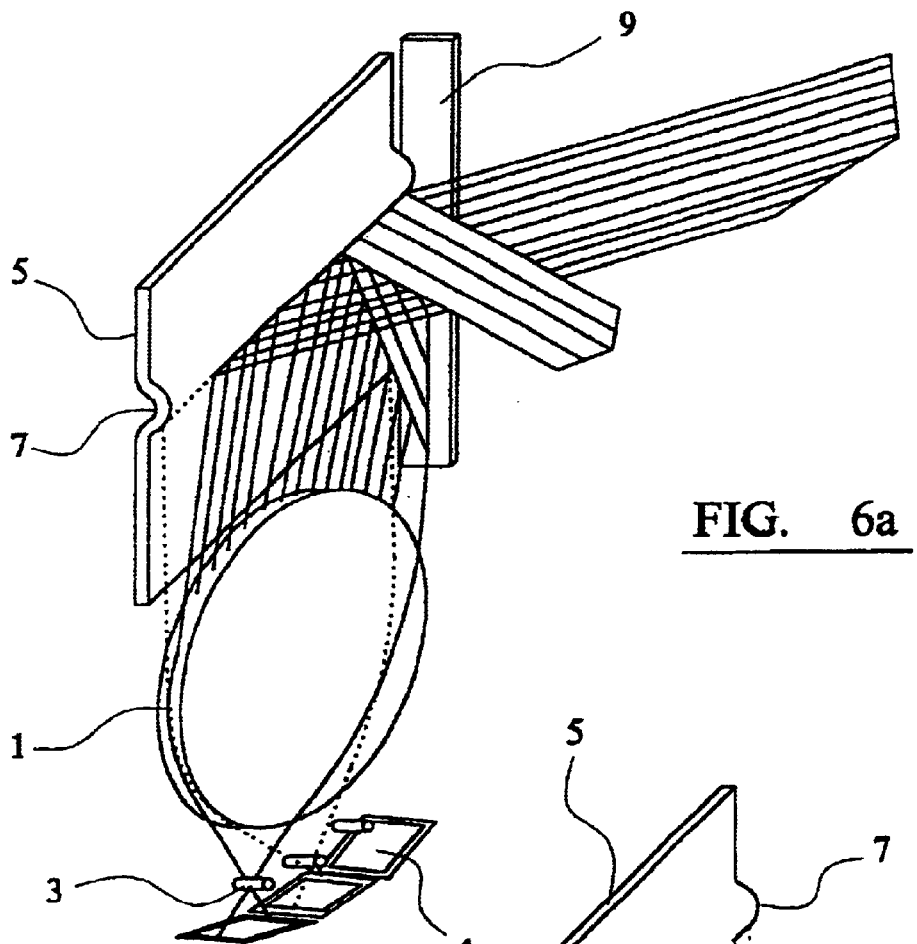
FIGS. 6a and 6b illustrate how a pair of mirrors fold rays from opposite off-axis microdisplays so that rays folded from one microdisplay fill in the gaps of a view left by rays from the opposite microdisplay.
Figure 6B:
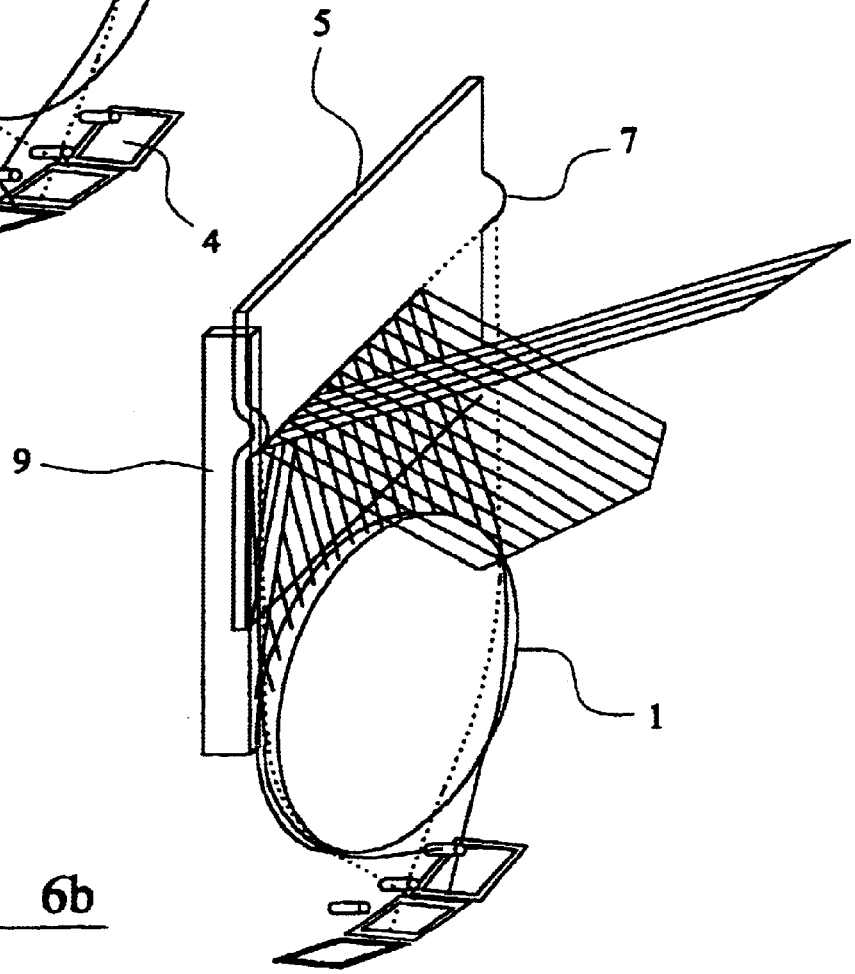

The pair of mirrors 9 are placed at either side of the sheet of foil as shown in FIGS. 6a and 6b so that the rays going over the edge of the sheet of foil 5 and therefore "mussing" the sheet so that it cannot reflect them are reflected back. These reflected rays will now become part of the opposite view to that formed by unreflected rays, but in doing so the reflected rays fill in the gap left in the opposite view by the rays in that opposite view leaving part of the surface wave 7, unilluminated. It is then a matter merely of swapping pixels in the frame store to ensure that the right pixels end up on the right position on the screen.

Further embodiments of the invention will now be described which use diffraction gratings.

If collimated light is injected into a slab waveguide and a weak diffraction grating is embossed on one surface of the slab waveguide then the grating will diffract some of the light out of the waveguide. The direction in which the diffracted light leaves the waveguide will be determined by the initial direction of the injected light, so that by modulating the intensity of light collimated into each of several directions at the input to the waveguide, one can control the intensity of light being diffracted out by the grating, and this can be used to project an image.

FIG. 7 shows how light is injected into a slab waveguide 10 from a wide-field-of-view projection display comprising a circularly symmetric lens 1 and an array of light emitters 2. Light from each pixel of the array of light emitters 2 is collimated by the circularly symmetric lens 1 in a particular direction, and this beam is coupled into the slab wave-guide 10 and diffracted out from all of one surface of the slab waveguide 10 by the weak diffraction grating 11 so as to cause collimated light to travel in a particular direction. Other pixels of the array of light emitters 2 cause light to be diffracted by the weak diffraction grating 11 in other directions, and the result is the projection of a 2D image from a flat panel.

In general, a three-dimensional display can be created by placing a fast-switching liquid-crystal display 12 over a large projection display, and FIG. 8 illustrates how this principle is applied to a wide-field-of-view flat-panel three-dimensional display, by placing a fast-switching liquid-crystal display 12 over the slab 10. The image can be either autostereoscopic, in which case pixels in the array of light emitters 2 should abut, or holographic, in which case pixels in the array of light emitters 2 should be point sources. The only difference in practice is that holographic systems need pixels small enough to give rise to diffractive effects.

At extreme angles light from the wide field of view projection display in FIG. 7 may miss the slab waveguide 10 as in FIG. 5. FIG. 9 shows how a pair of mirrors 9 and a one-dimensional retroreflector 13 can be used both to fold the optical system, so that the slab waveguide 10 can be on top of the lens 1, and to ensure that light is injected into all of the slab waveguide 10 even at wide fields of view. Light which would otherwise leave the system is reflected by one of the mirrors 9 so as to land on a one-dimensional retroreflector 13, then on an angled mirror 14. The planes, of the one-dimensional retroreflector 13 and angled mirror 14 are positioned at right angles to each other and at 45° to the plane of the lens, so that light is returned in the plane of the slab wave-guide 10, and the prisms of the retroreflector are run perpendicular to the long axis of the retroreflector so that light returns back along the same path in the plane of the slab waveguide 10 as that on which the light travelled out in the plane of the wide field of view projector. The retroreflected light will hit the same one of the pair of mirrors 9 which it hit on its outward journey, and therefore be directed into the slab waveguide 10 at a congruent position and direction to that at which it left the circularly symmetric lens of the wide-field-of-view projector.

Figure 10:
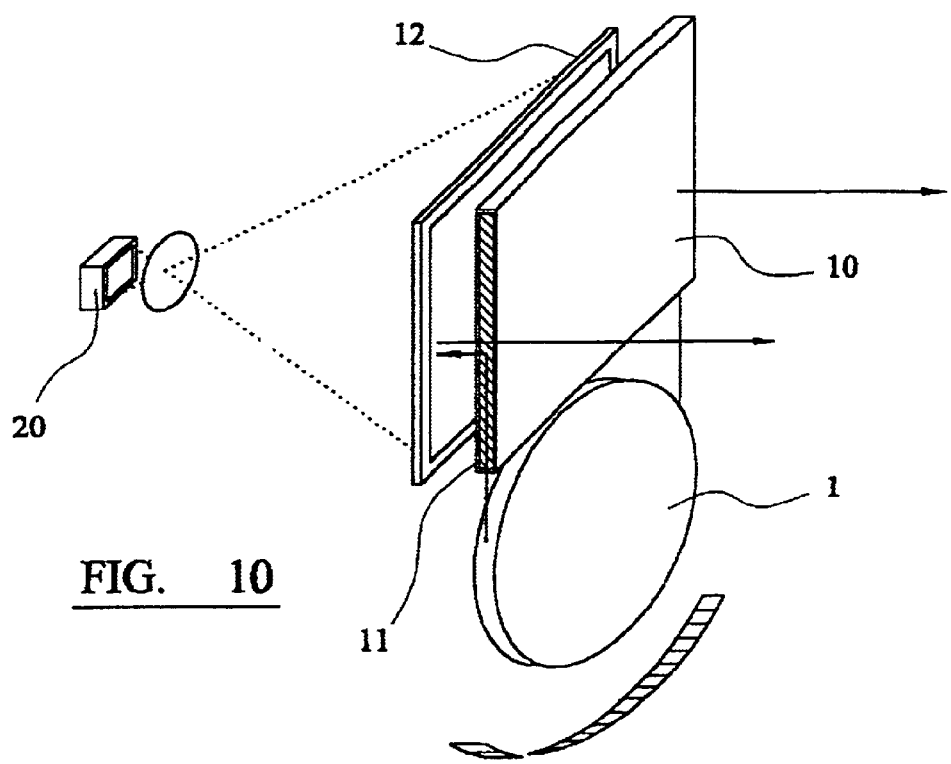
FIG. 10 illustrates a wide-field-of-view three-dimensional flat panel display using a light valve, representing a third embodiment.
Figure 14:
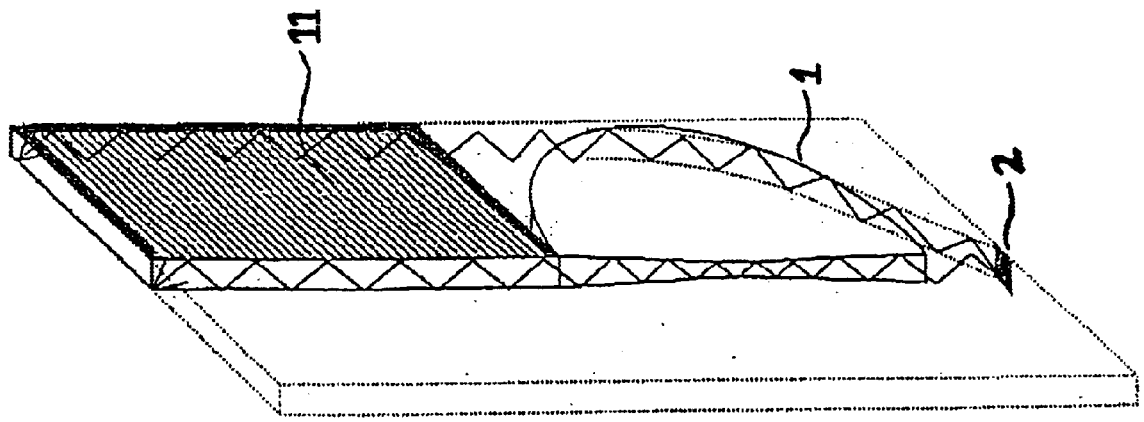
FIG. 14 is a sectional view of a lens and grating combination similar to that shown in FIG. 10.

Fast-switching liquid-crystal displays can be more conveniently manufactured if they work in reflection rather than (as in the above example) transmission. This permits for example the use of thick metal wires on the back of the display which switch quickly because they are highly conductive, but are opaque. It also permits the use of light valves sometimes known as optically addressable spatial light modulators. FIGS. 10 and 14 show shows to synthesize a wide-field-of-view three-dimensional image on a light valve Light from a wide-field-of-view projection display is injected into the side of a slab waveguide 10, and the slab waveguide 10 incorporates a weak grating 11 but the grating 11 is blazed and volumetric so as to eject light only towards the front surface of the fast-switching liquid-crystal display 12. Such a grating can for example be made by gluing two sheets of 3M Image Directing Film IDF II face to face with a transparent glue of a slightly different refractive index to the film. Light reflected off the fast-switching liquid-crystal display 12 travels back through the slab waveguide 10 and on to the viewer with only minimal disruption from the grating 11 because the grating 11 is weak. The display 12 is optically switched by a projector 20. The lens 1 in FIG. 14 is a monocentric lens made of a generally circular transparent disc the thickness of which varies by radius and which is adapted to receive light at the edge.

Figures 11, 12:
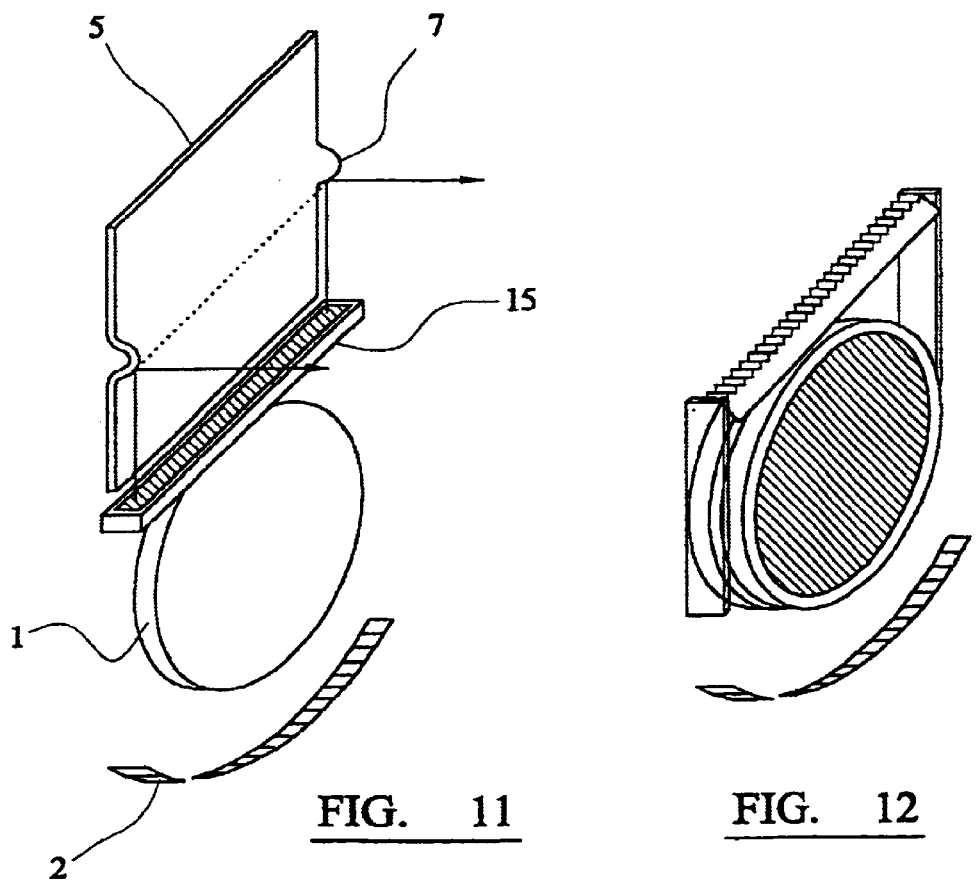
FIG. 11 illustrates a holographic wide field-of-view flat-panel display which needs no thin-film transistors.
FIG. 12 illustrates a wide-field-of-view flat-panel head-mounted display.

Referring to the diagram of FIG. 3, the sheet of foil 5 and surface wave 7 or other ejection means can be used to convert any one-line-high three-dimensional display into a full flat-panel three-dimensional display, and the circularly symmetric lens 1 can be used to expand the field of view of most three-dimensional display concepts. FIG. 11 shows for example how a holographic three-dimensional display with a wide field of view can be made by arranging that the array of light emitters 2 in the focal plane of the circularly symmetric lens 1 is formed by a series of unmodulated point sources, and that this combination is used to illuminate a one-dimensional liquid-crystal display 15. The field of view of a hologram screened on such a liquid-crystal display 15 is determined by the size of its pixels, but a hologram with a wide field of view can be time-multiplexed by illuminating each of the point sources in the array of light emitters 2 and simultaneously altering the hologram on the one-dimensional liquid-crystal display 15 within the time taken for the surface wave 7 to move the width of a single line. Wide fields of view are possible with such a display because the minimal aberrations of the circularly symmetric lens 1 allow the constituent holograms to be time-multiplexed without gaps or overlap. The single long LCD 15 is more difficult to make than the small microdisplays 4 of the previous embodiments but it is easier to make the pixels necessary for a hologram.

If the same set-up is intended to display three-dimensional images using autostereoscopic rather than holographic pixellation, one line of one view is shown at a time on the liquid-crystal display 15. The equivalent line of other views can be time-multiplexed without gaps or overlap; to this end the array of light emitters 2 must now comprise sources of light which abut without gaps. Also a diffuser should be used, as with previous embodiments.

An important advantage of using the circularly symmetric lens 1 in the flat-panel concepts so far described is that with proper design it can be stamped out of plastic in a single quick action. However, circularly symmetric lenses can be made using bulk optics and the concept extended to bulk optic three-dimensional displays if required.

Demand also exists for the field of view of head-mounted displays to be expanded, and this could be done by providing a curved array of light emitters in the focal plane of a bulk optic circularly symmetric lens, as shown in FIG. 12.

Figure 13:
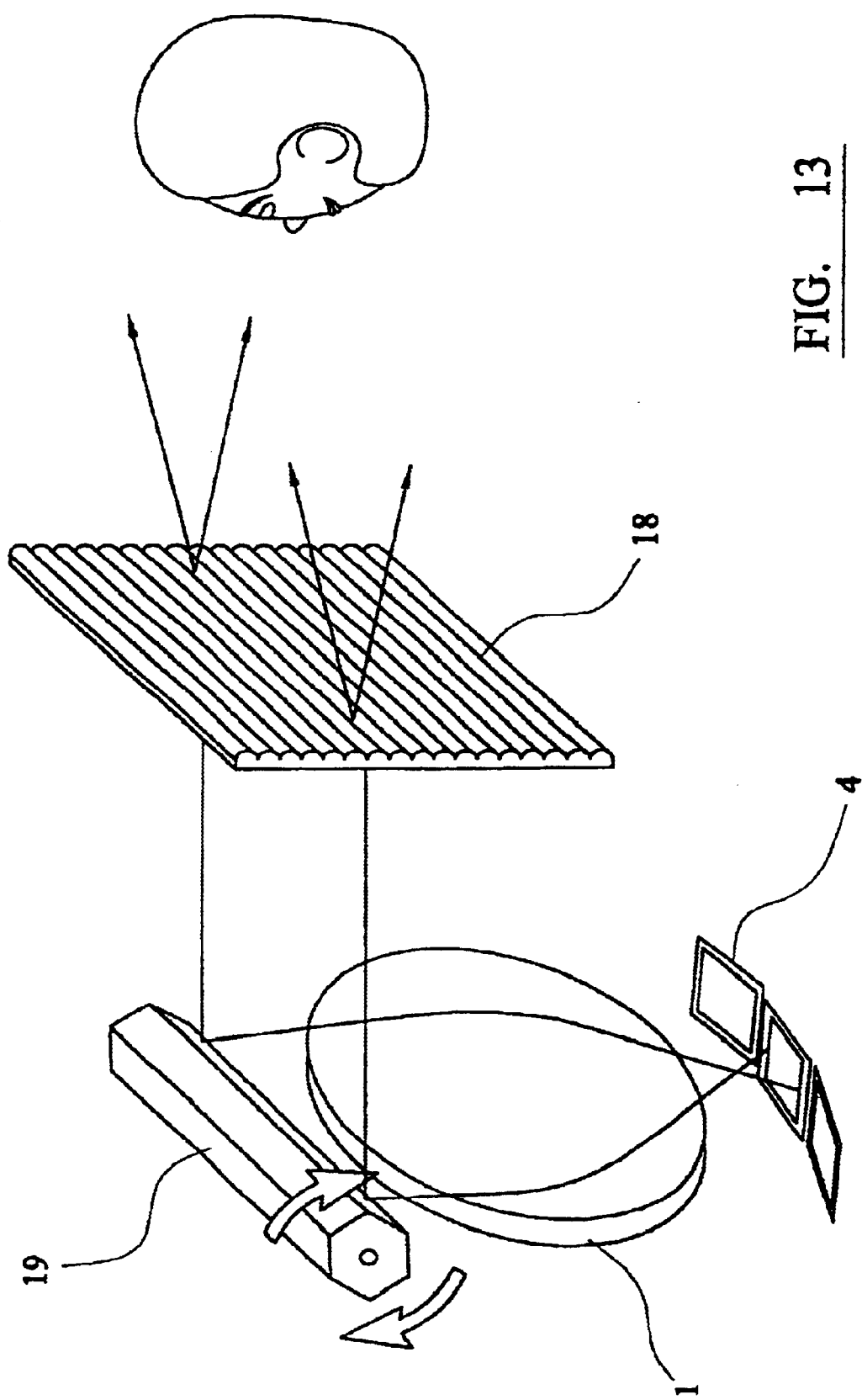
FIG. 13 shows a fourth embodiment of the invention.

A variant of the "mechanical" method of line-by-line extraction of the image is shown in FIG. 13. Here the output from the lens 1 is directed at a spinning right-hexagonal prism with its axis normal to the main propagation direction. The speed of rotation of the prism is synchronized with the line display on the projectors 4, so that when the projector has run through all the horizontal lines of the image the prism has rotated by one sixth of a revolution and is ready to reflect the next line towards the top of the screen once more. A lenticular diffuser plate 18 spreads the image in the vertical direction, and a precision azimuthal diffuser (not shown) is provided for moving the images from the different projectors.

In general, and where appropriate, all the features of the embodiments described can be used in any desired combination.

What is claimed is:

1. A flat-panel wide-field-of-view projection display comprising a disc-shaped, circularly symmetric lens collimating light from points in a focal circumference around the disc, and an array of light emitters positioned along the focal circumference of the circularly symmetric lens so that light rays from each of the light emitters are substantially collimated by the lens in the plane of the lens in a different direction from its neighboring light emitters and pass through the lens as a beam; a light modulator for modulating the rays; and a ray-diverting means upon which the collimated light impinges and which ejects said light out of the plane of the lens and towards a viewer.

2. A projection display according to claim 1, in which the ray-diverting means comprises a flat panel of material.

3. A projection display according to claim 2, further comprising line-selecting means associated with the panel for selecting one line at a time of an image from the array of light emitters so as to display that line.

4. A projection display according to claim 3, in which the ejection of the collimated light out of the plane is by deflection of the rays from the panel at the selected line.

5. A projection display according to claim 3, in which the ray-diverting means includes a rotating prismatic reflector (20) and the selecting means includes means for synchronizing the rotary position of the reflector with the modulation of the light.

6. A projection display according to claim 4, in which the panel includes a reflective sheet (5) and the selecting means is a transducer (6) for producing a localized, linear, acoustic or surface wave in the sheet, the presence of the wave at a given position causing reflection of the ray.

7. A projection display according to claim 4, in which the panel is a waveguide (10) into which light from the lens is injected.

8. A projection display according to claim 7, in which the ejection means (11) is a diffraction grating, which causes collimated light to travel in a particular direction.

9. A projection display according to claim 7 in which the line-selecting means comprises a layer of strip on the panel or at any other position in the collimated beam of light, which is switchably reflective or transparent; the means for selecting the position at which the rays are ejected being adapted to change the state of the switchable layer.

10. A projection display according to claim 1 in which each light emitter includes a microdisplay (4) acting as the light modulator.

11. A projection display according to claim 10, in which each light emitter comprises a microdisplay and an individual lens (3), arranged so that the microdisplay emits light towards the individual lens; each individual lens being positioned on the focal circumference of the circularly symmetric, lens (1).

12. A projection display according to claim 11, in which each individual lens is cylindrical and separated from the microdisplay by its focal distance.

13. A projection display according to claim 10, in which neighboring microdisplays each project a complete one-dimensional image, the images differing only in the angle view or phase.

14. A projection display according to claim 10, in which a frame store is provided for each microdisplay to store successive images of a moving display.

15. A projection display according to claim 1, in which the light emitters are point sources, used to display a hologram, or abutting sources, used to display an auto-stereoscopic view.

16. A projection display according to claim 1, and further including a diffuser (8) positioned after the ray-diverting means in order to narrow the gaps between the beams from adjacent light emitters.

17. A projection display according to claim 2, which the light sources are unmodulated and the light modulator is in the form of a switchable strip provided in the path of the collimated rays, between the circularly symmetric lens and the panel, in order to modulate the collimated light.

18. A projection display according to claim 2, further including a reflector (9), provided to at least one side of the panel (10) to reflect an outer portion of the image that misses the panel back towards the panel.

19. A projection display according to claim 18, further including image-processing means adapted to ensure that the reflected pixels display the correct part of the image, taking into account the reflection.

20. A projection display according to claim 2, arranged with the circularly symmetric lens (1) and panel (5, 10) in substantially the same plane, preferably the plane in which the light is emitted from the light emitters.

21. A projection display according to claim 2, in which the planes in which the panel and lens are formed are adjacent and parallel, folding means being provided to fold the optical system so that rays emitted from the edge of the lens are directed into the panel.

22. A monocentric lens comprising a generally circular transparent disc defining two opposite faces joined by a cicumferential edge and whose thickness varies with radius in such a way that light can be injected into, the edge of the disc, at an angle slightly off the normal to the axis of the disc, and be totally internally reflected off the faces of the disc, emerging as a collimated beam from the set edge at location remote from the point of entry.

* * * * *

UNITED STATES PATENT AND TRADEMARK OFFICE
CERTIFICATE OF CORRECTION

| | |
|---|---|
| PATENT NO. | : 6,712,471 B1 |
| APPLICATION NO. | : 09/937756 |
| DATED | : March 30, 2004 |
| INVENTOR(S) | : Adrian Robert Leigh Travis et al. |

It is certified that error appears in the above-identified patent and that said Letters Patent is hereby corrected as shown below:

Column 2, line 13, replace "screen only one" with --screen. Only one--.

Column 2, line 35, replace "no. Nov. 11," with --no. 11, Nov.--.

Column 3, line 47, after "reflected" insert --)--.

Column 4, line 2, after "consisting" delete ",".

Column 4, line 4, replace "distance if the" with --distance. If the--.

Column 4, line 29, after "are" delete ":".

Column 4, line 43, after "reflected" delete ",".

Column 5, line 55, after "coating" delete ",".

Column 6, line 16, replace "microxdisplay" with --microdisplay--.

Column 6, line 26, after "foil" replace "S" with --5--.

Column 6, line 28, delete paragraph break.

Column 6, line 29, replace "inventorys" with --inventor's--.

Column 7, line 29, replace "mussing" with --missing--.

Column 8, line 37, replace "shows" with --how--.

Column 11, (claim 22) line 6, replace "cicumferential" with --circumferential--.

Column 11, (claim 22) line 7, replace "into," with --into--.

Column 12, (claim 22) line 3, replace "locations" with --a location--.

UNITED STATES PATENT AND TRADEMARK OFFICE
CERTIFICATE OF CORRECTION

PATENT NO.        : 6,712,471 B1
APPLICATION NO. : 09/937756
DATED             : March 30, 2004
INVENTOR(S)       : Adrian Robert Leigh Travis et al.

It is certified that error appears in the above-identified patent and that said Letters Patent is hereby corrected as shown below:

Column 12, (claim 22) line 3, replace "the set edge" with --the edge--.

Signed and Sealed this

Twenty-first Day of August, 2007

JON W. DUDAS
*Director of the United States Patent and Trademark Office*